Dec. 26, 1944.    E. W. REYNOLDS    2,365,840
BEARING DEVICE
Filed Nov. 17, 1942
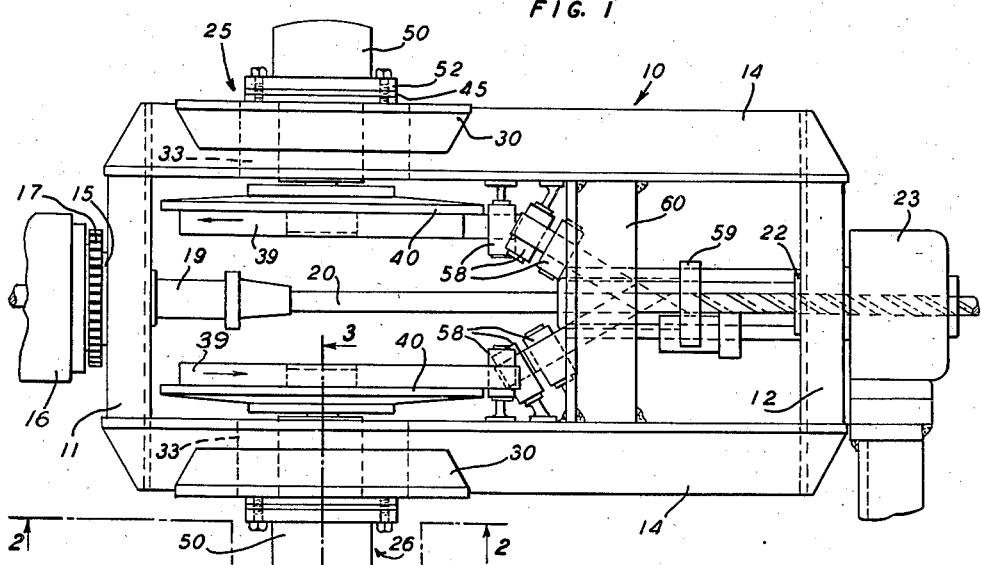
INVENTOR
E.W. REYNOLDS
BY
E.R. Nowlan
ATTORNEY Patented Dec. 26, 1944

2,365,840

UNITED STATES PATENT OFFICE 2,365,840

BEARING DEVICE

Ellwood W. Reynolds, Westfield, N. J., assignor to Western Electric Company, Incorporated, New York, N. Y., a corporation of New York Application November 17, 1942, Serial No. 465,837

11 Claims. (Cl. 57—15)

This invention relates to bearing devices, particularly for material supporting spindles in material serving heads.

In conventional types of serving heads employed for serving material, such as paper tape, to cores or cables, the tape supplies are frequently in the form of circular pads mounted on rotatable spindles and supported by reenforcing plates to eliminate disturbance of the supply pads by centrifugal force during rotation of such serving heads. In such instances each supply pad, reenforcing plate and spindle structure under high speed operation and the resulting centrifugal multiplier, produce a very heavy thrust load on bearings supporting the spindle. This thrust load is in many instances so great that even with best selection of anti-friction bearings, a considerable frictional resistance is presented to the rotation of the pad spindle. Furthermore, the resulting tape tension as the supply pad approaches its smallest diameter, is frequently above the maximum amount desired for taping the core, and may sometimes be sufficient to break the tape.

An object of the invention is to provide a simple, yet highly efficient bearing device, particularly adapted for the spindle structure of a material serving machine, which is capable of eliminating the frictional resistance resulting from centrifugal force on the spindle assembly.

With this and other objects in view, the invention comprises a bearing device including a rotatable spindle movable about an axis disposed at an angle with respect to its own axis and having a structure for the spindle adapted to counteract the effect of centrifugal force thereon.

Other objects and advantages will be apparent from the following detailed description when considered in conjunction with the accompanying drawing, wherein Fig. 1 is a front elevational view of a serving head embodying the invention;

Fig. 2 is a fragmentary detail view taken along the line 2—2 of Fig. 1, and

Fig. 3 is an enlarged fragmentary sectional view taken along the line 3—3 of Fig. 1.

Referring now to the drawing, attention is first directed to Fig. 1, which illustrates a serving head, indicated generally at 10, composed of end members 11 and 12 with interconnecting longitudinal members 14. The end member 11 is suitably supported on a hollow shaft 15 journaled in a bearing 16 and driven, through a gear 17, by any suitable mean (not shown). A tubular member 19, extending through the shaft 15, serves as a guide for an advancing core 20 which, in the present instance, is a cable formed of electrical conductors. The end 12 is supported by a hollow shaft 22 which is journaled in a bearing 23 and thus supported for rotation. A pair of supply units 25 and 26 is provided for the serving head, these units being identical in structure and a specific description of one applying equally well to the other. For this reason a specific description of the unit 26 will be made and like reference numerals will be directed to like parts of both units.

Attention is now directed to Fig. 3, which illustrates the detailed structure of the unit 26. It will be apparent in this figure that the adjacent members 14 of the serving head 10 are angular in cross-section and are spaced apart. Another pair of angle members 30 is secured by means of welding to the angle members 14. A tubular bearing support 31 is mounted between the members 14 and is provided with an integral annular flange 32 at its outer end. Means, such as blocks 33 (Fig. 2), may be interposed between the angle members 14 and secured in place thereto by suitable means such as welding, to maintain the support 31 in a given position. Anti-friction bearings 35 and 36 are mounted in the support 31, to rotatably support a hollow spindle 37. The spindle 37 extends inwardly, or upwardly in this figure, to a position where it is provided with a hub 38, the latter being adapted to support a pad or supply of tape 39. Due to centrifugal force upon the pad 39 during high speed rotation of the serving head 10, the pad must be supported at the outer side thereof, this being done by a disc-shaped supporting member 40 which is mounted upon the spindle 37 for rotation therewith.

At the opposite end of the spindle a hollow float 42 is mounted through the aid of a shank 43 threadedly disposed in the adjacent end of the spindle. The float 42 is of the structure shown, having a convexed end 43' and being cylindrical in cross-section. Suitable sealing means 44, mounted in a disc 45, is provided to seal a fluid chamber 47 from the bearing support 31, its bearings and the spindle. The chamber 47 is formed in a bearing cap or housing 50, which is cylindrical in cross-section and similar in contour to the float 42, it being provided with a concaved outer end 51 of a contour similar to the convexed portion or end 43' of the float. The bearing cap 50 has an annular flange 52 integral therewith, providing means, through the aid of screws 53, for the securing of the cap to the flange 32 of the support 31. A suitable fluid 55, such as mercury, oil, water or the like, is disposed in the cap 50, that is, in the chamber 47 thereof, to fill a portion of the space between the float 42 and the inner wall of the chamber 47. It should be understood that the support 31 and its connected parts, including the disc-shaped member 45, the cap 50, as well as the bearings 35 and 36, are held against displacement relative to the angle members 14 of the serving head, other than the necessary rotary movements of the parts of the bearings. However, the spindle 37 is so supported that it may move a suitable distance axially as a result of centrifugal force. With this axial movement of the spindle, the pad 39 and the member 40 are also moved.

Attention is again directed to Fig. 1, which illustrates a suitable number of guide rolls 58 for the tape from each supply, to direct the tapes to the core 20 during advancement of the latter and during rotation of the serving heads. It will be apparent, from arrows shown in Fig. 1, that the pads in the units 25 and 26 are rotated in opposite directions, this being an unimportant fact in the present instance, as this follows the customary method of serving the tape. Other suitable means, such as a polishing head or die 59, may be mounted in the serving head 10 through the aid of a lateral support 60 to complete the serving of the tape or material to the core.

During the operation of the machine, the serving head is rotated at a given speed, for example one thousand five hundred revolutions per minute. It is apparent from this action that centrifugal force would tend to move the pads 39 together with their supporting members 40 and associated shafts outwardly. This force is at its maximum when the pads are full and gradually decreases to a minimum force when the pads approach the empty condition, yet at all times the existing centrifugal force is such that frictional resistance at the spindles will be greater than desired, even with the assistance of the bearings 35 and 36. In the present embodiment, however, the ends of the spindles supporting the supply of material are provided with fluid bearings which act not only in providing a frictionless support for the outward end thrust of the spindles, but serve to counteract the effect of centrifugal force on the spindles and their associated supporting bearings. This is due to the fact that centrifugal force affects the fluid in each chamber 47. The increase in centrifugal force from the start of the serving head to its maximum speed, tends to force the fluid outwardly in the chamber and between the convexed end 43' of the float and the concaved wall 51 of the cap 50. By providing a suitable amount of fluid, depending upon the size of the float and the associated cap, it is possible for the effective force of the fluid to be greater than that of the spindle and its associated parts to move this spindle structure in an opposite direction from that caused by centrifugal force, to remove entirely any frictional resistance which would otherwise exist at the spindle. Thus it is possible to balance the spindle and associated structure depending upon the amount of fluid employed.

In the present instance it has been determined that the best quantity of fluid to employ would be the amount necessary to balance the spindle supporting member and other structure without the pad, or when the pad is empty, to produce the least friction on the spindle when there normally exists greater friction or tension on the material. It should be understood that during the serving of the material, the pad 39, its support 40, the spindle 37 and float 42 are rotated by the withdrawal of the material from the pad, and as the pad decreases in size the tension on the material becomes greater, this being due to the gradual decrease in length of the theoretical torque arm of the pad. In some instances additional means is provided to balance the tension on the material and to allow for this variation, yet in the present instance such means may be done away with, as the variation in the tension is taken care of by the fluid bearing. This is explained by the variation in the centrifugal force tending to move the spindle and its associated structure outwardly against the effect of the fluid during the removal of the material from the pad. At the beginning, when the pad is full, there exists a structure which, due to centrifugal force at a given rotary speed of the serving head, may, with a given amount of fluid in the chamber 47, result in a given existing resistance, which is gradually reduced during the paying off of the material of the pad to the point where the rotating structure is balanced and free of the frictional resistance due to centrifugal force at the time the pad is empty. Thus it will be apparent that the tension on the material being withdrawn by the advancing of the core during the rotation of the serving head, may be varied by varying the quantity of fluid in the chamber and the selected tension may be made constant on the material by the variation between a constant mass of fluid and a varying mass controlled thereby, the latter including the pad of material. Therefore, with the present structure the disturbing frictional resistance caused by centrifugal force on the material supply and its rotatable supporting means, has not only been disposed of but utilized in a varying degree to maintain constant tension on the material as it is paid off the supply.

Although specific improvements of the invention have been shown and described, it will be understood that they are but illustrative and that various modifications may be made therein without departing from the scope and spirit of this invention as defined by the appended claims.

What is claimed is:

1. A bearing device comprising a spindle mounted for rotation about its axis, means to cause rotation of the spindle, means to move the spindle about an axis, disposed at an angle relative to the spindle axis, creating an axial centrifugal thrust on the spindle, and a bearing including a fluid affected by centrifugal force to counteract the said thrust.

2. A bearing device comprising a spindle mounted for rotation about its axis, means to cause rotation of the spindle, means to move the spindle about an axis, disposed at an angle relative to the spindle axis, creating an axial centrifugal thrust on the spindle, a housing adapted to seal therein a quantity of fluid, disposed adjacent the outer end of the spindle, and means mounted on the outer end of the spindle in the housing and affected by the fluid to counteract the said thrust.

3. A bearing device comprising a spindle mounted for rotation about its axis, means including a supply of material mounted on the spindle to rotate the spindle by the withdrawing of the material from the supply, means to move the spindle about an axis, disposed at an angle relative to the spindle axis, creating an axial centrifugal thrust on the spindle, and a bearing including a fluid affected by centrifugal force to counteract the said thrust.

4. A bearing device comprising a spindle for a supply of material mounted for rotation about its axis, means to withdraw the material from the supply under tension to cause rotation of the spindle, means to move the spindle about an axis, disposed at an angle relative to the spindle axis, creating an axial centrifugal thrust on the spindle, and means adapted to apply a counterthrust to the spindle.

5. A bearing device comprising a spindle for a supply of material mounted for rotation about its axis, means to withdraw the material from the supply under a given tension to cause rotation of the spindle, means to move the spindle about an axis, disposed at an angle relative to the spindle axis, creating an axial centrifugal thrust on the spindle, and means adapted to apply a counterthrust to the spindle to maintain the given tension.

6. A bearing device comprising a spindle for a supply of material mounted for rotation about its axis, means to withdraw the material from the supply under a given tension to cause rotation of the spindle, means to move the spindle and supply about an axis, disposed at an angle relative to the spindle axis, creating an axial centrifugal thrust on the spindle which varies with reduction in the size of the supply, and means adapted to apply a counterthrust to the spindle to maintain the said given tension constant.

7. A bearing device comprising a spindle for a supply of material mounted for rotation about its axis, means to withdraw the material from the supply under a given tension to cause rotation of the spindle, means to move the spindle and supply about an axis, disposed at an angle relative to the spindle axis, creating an axial centrifugal thrust on the spindle which varies with reduction in the size of the supply, and means adapted to apply a counterthrust to the spindle which varies with variations in the said centrifugal thrust to maintain the said given tension constant.

8. A bearing device comprising a spindle mounted for rotation about its axis, means to cause rotation of the spindle, means to move the spindle about an axis, disposed at an angle relative to the spindle axis, creating an axial centrifugal thrust on the spindle, a cylindrical float mounted at the outer end of the spindle, a housing for the float, and a fluid in the housing affected by centrifugal force to apply a counterthrust to the spindle.

9. A bearing device comprising a spindle for a supply of material mounted for rotation about its axis, means to withdraw the material from the supply under a given tension to cause rotation of the spindle, means to move the spindle about an axis, disposed at an angle relative to the spindle axis, creating an axial centrifugal thrust on the spindle, a cylindrical float mounted at the outer end of the spindle, a housing for the float, and a fluid in the housing affected by centrifugal force to apply a counterthrust to the spindle through the float.

10. A bearing device comprising a spindle for a supply of material mounted for rotation about its axis, means to withdraw the material from the supply under a given tension to cause rotation of the spindle, means to move the spindle about an axis, disposed at an angle relative to the spindle axis, creating an axial centrifugal thrust on the spindle, a cylindrical float mounted at the outer end of the spindle, a housing for the float having a cylindrical inner wall spaced from the sides and outer end of the float, and a fluid disposed in the space between the inner wall and the float and affected by centrifugal force to apply a counterthrust to the spindle float and thus to the spindle.

11. A bearing device comprising a spindle for a supply of material wound for rotation about its axis, means to withdraw the material from the supply under a given tension to cause rotation of the spindle, a cylindrical float having a convexed outer end secured at its inner end to the outer end of the spindle, a housing for the float having a cylindrical wall and concaved end, respectively, spaced from the side and convexed end of the float, and a fluid disposed in the housing about the float and affected by centrifugal force urging it between the said concaved and convexed ends to apply a counterthrust to the spindle.

ELLWOOD W. REYNOLDS.